Figure 1:
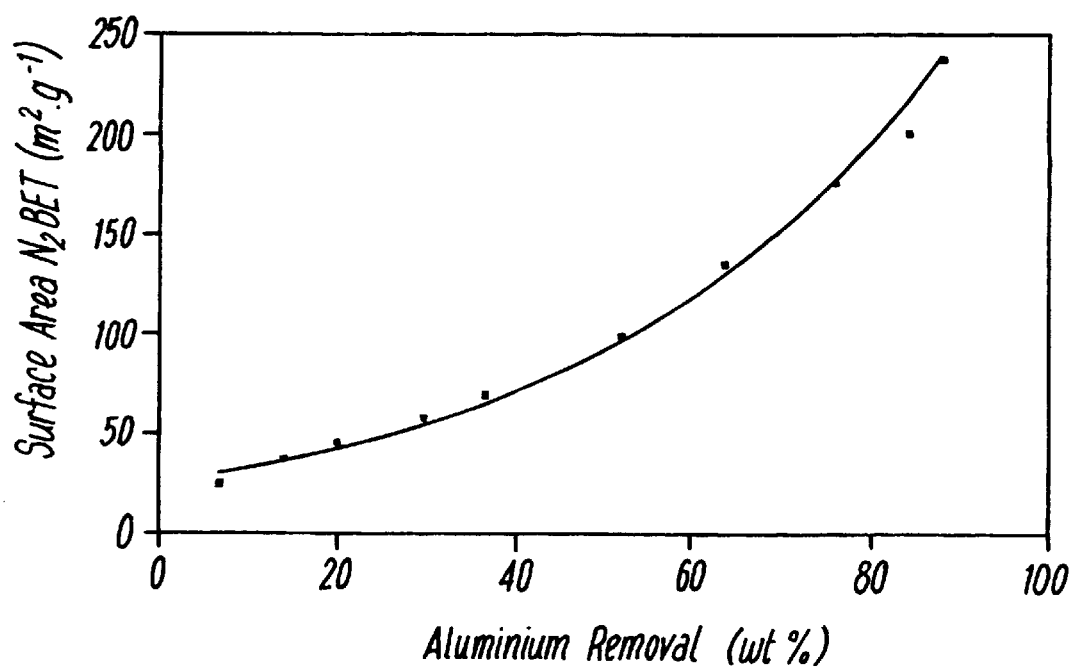

United States Patent
Jones et al.

[11] Patent Number: 6,136,740
[45] Date of Patent: Oct. 24, 2000

[54] POROUS INORGANIC PARTICULATE MATERIAL

[75] Inventors: Thomas Richard Jones, Cornwall; Christopher Derek Paynter, Truro, both of United Kingdom

[73] Assignee: Imerys Minerals, Ltd., United Kingdom

[21] Appl. No.: 09/188,848

[22] Filed: Nov. 9, 1998

[30] Foreign Application Priority Data

Nov. 12, 1997 [GB] United Kingdom ............ 9723818

[51] Int. Cl.⁷ ................................. C04B 33/04
[52] U.S. Cl. .............. 501/144; 501/146; 501/147; 501/148; 501/150; 106/416; 106/486; 106/492
[58] Field of Search ................ 501/141, 144, 501/146, 145, 147, 148, 150; 106/416, 486, 492

[56] References Cited

U.S. PATENT DOCUMENTS 3,733,391  5/1973  Hoffman .................... 423/118

FOREIGN PATENT DOCUMENTS 2120571A  12/1983  United Kingdom.

OTHER PUBLICATIONS

R.H. Meinhold et al, "Comparison of the kinetics of flash calcination of kaolinite in different calciners" vol. 72, No. A1, Jan. 1994 pp. 105–113—See search report.

D. Bridson et al, "Properties of flash calcined kaolinite" vol. 33, No. 3, Jun. 1985, pp. 258–260—see search report.

*Primary Examiner*—Paul Marcantoni
*Attorney, Agent, or Firm*—Finnegan, Henderson, Farabow, Garrett & Dunner, L.L.P.

[57] ABSTRACT

A method of producing a porous inorganic particulate material which comprises treating a particulate aluminosilicate material with a leaching agent which chemically reacts with or solubilizes aluminum and thereby leaches aluminum from the aluminosilicate material, wherein the particulate aluminosilicate material is a particulate hydrous aluminosilicate material which has been flash calcined.

18 Claims, 1 Drawing Sheet

POROUS INORGANIC PARTICULATE MATERIAL

BACKGROUND OF THE INVENTION

1. Field of the Invention

The present invention relates to porous inorganic particulate material and the production and use of such material. In particular, the present invention relates to porous inorganic material comprising an aluminosilicate, eg derived from a clay mineral.

2. Prior Art

Aluminosilicate particulate materials are well known for use in a variety of particulate filler, pigment and extender applications. Acid leaching of aluminosilicate particulate materials, eg clays, which have been calcined is known from various prior patent specifications, eg GB2120571B. However, the materials to which the acid leaching step is applied in the methods described in these prior art references are materials such as metakaolin produced by conventional calcining procedures.

SUMMARY OF THE INVENTION

The present invention is concerned with application of acid leaching to an aluminosilicate particulate material which has been calcined in an unconventional way selected to give unexpected product benefits described hereinafter following the acid leaching step.

According to the present invention in a first aspect there is provided a method of producing a porous inorganic particulate material which comprises treating a particulate aluminosilicate material with a leaching agent which chemically reacts with or solubilizes aluminum and thereby leaches aluminum from the aluminosilicate material, wherein the particulate aluminosilicate material is a particulate hydrous aluminosilicate material which has been flash calcined.

Producing an acid leached particulate product in this way rather than using so called 'soak calcining' or slow calcining to produce the calcined material to be acid leached as in the prior art unexpectedly and beneficially gives numerous product benefits or improvements, especially high porosity, high surface area and low specific gravity as described later.

DESCRIPTION OF THE INVENTION

The hydrous aluminosilicate material employed in the method of the invention may comprise a clay mineral, eg of the kandite and/or smectite types. Clay minerals of the kandite type include kaolin-containing minerals such as china clays, ball clays, fire clays, dickite, nacrite and halloysite. Clay minerals of the smectite type include bentonite and other montmorillonite-containing materials, hectorite and saponite and other water swelling clays. Hydrous kaolin and kaolin-containing materials, eg materials containing at least 90% by weight kaolin, desirably at least 96% by weight kaolin are preferred as the aluminosilicate material.

A flash calcined particulate material is one which has been calcined extremely rapidly, eg by calcining for a period of less than 0.5 seconds, often less than 0.1 second. Preferred methods for the flash calcination of aluminosilicate particulate material for use in the method of the invention are described hereinafter. In the flash calcination of hydrous aluminosilicates, water is driven off by the rapid heating. Preferably, the rate of heating the hydrated aluminosilicate particulate material is such that the rate of expansion of the water vapour formed is greater than the rate of diffusion of the water vapour through the crystal structure of the particles. This causes an internal build-up of pressure of the water vapour inside the particles and a multiplicity of sealed voids are produced in the core of the particles by a rapid blistering effect. Preferably, the rate of heating the particles in the flash calcining is such that the temperature of the material is raised at a rate greater than $10^3$ Celsius degrees per second, eg at least $5\times10^3$ Celsius degrees per second, in some cases at least $10^4$ Celsius degrees per second.

Preferably, where the aluminosilicate material employed in the method of the invention comprises kaolin, the conditions of the flash calcining process are such that at least a portion, preferably at least 90% by weight, desirably at least 96% by weight of the flash calcined particulate material produced comprises metakaolin. The blistering effect does not occur in conventional calcining processes, generally known as 'soak calcining', because the material is heated over a substantial period of time, eg many seconds or minutes and the rate of heating is not sufficiently rapid. Aluminum is far easier to leach from metakaolin than from kaolin. This is because the chemical environment of the aluminum is altered by the collapse of the long range order within the crystal brought about by calcination making it much more reactive. However if the calcination temperature is too high and/or if substantial fluxing agents are present, the metakaolin fuses and the aluminum within the glassy phase is made less accessible and the reactivity falls. Therefore, it is desirable that the aluminosilicate material and calcining temperatures used are suitable to form mainly, preferably essentially, metakaolin as the flash calcined product.

The maximum temperature to which the particles are heated in the method according to the first aspect of the present invention will depend upon the particular aluminosilicate material employed in the flash calcination process. Generally, heating temperatures will be in the range 300° C. to 1200° C. For a kaolin-containing starting material, the particles of the material may be heated to a maximum temperature in the range of from 400° C. to 950° C., especially from 500° C. to 750° C. for a starting material containing at least 90% by weight kaolin.

We have found unexpectedly and beneficially that the voids described above produced by flash calcining provide internal sites from which a network of channels and pores can be readily formed by the leaching step in the method according to the first aspect of the present invention. The product obtained by the leaching step can therefore have a microstructure which is different from that obtained by acid leaching aluminosilicates produced by calcining in the conventional way, ie by 'soak calcining' as referred to above.

As compared with known acid leached soaked calcined material, material produced by the method of the first aspect of the present invention can have:
(i) a higher specific surface area;
(ii) a different, and more extensive, pore structure; and
(iii) a lower specific gravity.

These benefits find use in the applications described hereinafter.

The particulate product obtained following the leaching step may have a high external and internal surface area, eg greater than 200 $m^2 \cdot g^{-1}$ ($N_2$ BET) using in the leaching step flash calcined clay produced by calcining clay containing at least 90% by weight kaolin. Beneficially and surprisingly, the surface area may be at least 220 $m^2 \cdot g^{-1}$, in some cases at least 250 $m^2 \cdot g^{-1}$.

The hydrous aluminosilicate material which is flash calcined for use in the method according to the first aspect of the present invention may be processed by well known procedures prior to flash calcination, eg to remove undesirable impurities present in the mineral form and to provide a suitable particle size distribution. Purifying the material may conveniently involve removing sources of fuel (eg lignin present in ball clay) or fluxing agents (eg quartz and feldspar) which may interfere with the calcined product, eg by forming a glassy phase with metakaolin. The particle size distribution may be selected to suit the final product application. Generally, the particle size distribution of the hydrous aluminosilicate material which is subjected to flash calcining may be such that at least 50% by weight of the particles thereof have an esd (equivalent spherical diameter measured in a well known way by sedimentation, eg using a SEDIGRAPH™ 5100 machine as supplied by Micromeritics Corporation, USA) less than 2 μm. The $d_{50}$ value of the material, ie the particle size value possessed by 50% by weight of the particles may conveniently be from 0.5 μm to 10 μm, eg 1 μm to 3 μm, especially from 1.5 μm to 2.5 μm. Generally, the particle size distribution of the hydrous aluminosilicate material which is flash calcined will determine (and be similar to) to particle size distribution of the eventual product obtained following flash calcination and acid leaching.

The flash calcination may advantageously be carried out in a furnace in which a toroidal fluid flow heating zone is established. Furnaces of the toroidal fluid flow kind are known per se. Such furnaces are described for example in U.S. Pat. No. 4,479,920 and WO98/03256 and are commercially available under the trade mark TORBED from Torftech Ltd, Mortimer, England, and its licensees. In such furnaces, a hot gas is passed through gaps between angled blades or vanes in a ring of blades or vanes provided in the operational chamber of the furnace. The blade ring is formed in an annular gap between the wall of the chamber and a central block, eg an upwardly pointing conical portion, located on the axis of the chamber. Gas flow is caused to follow a rotary path in a doughnut shaped region around the block and in individual swirls within the rotary path. This ensures efficient heat transfer to material, eg particulate material, to be heated in the gas flow.

The very efficient gas-solid contacting and high impact velocities obtainable with toroidal fluid flow furnaces can in turn provide numerous process benefits in the method according to the first aspect of the invention including:
(i) improved energy efficiency; in "massive" conventional furnace structures such as tunnel kilns, multiple hearth kilns (Herreschoff type) and fluid-beds the large structural surface area leads to radiation losses contributing greatly to thermal losses. The toroidal fluid flow furnace allows by its design limitation of such losses, but if required the use of heat recovery systems can further improve the thermal energy efficiency of the system;
(ii) improved process kinetics. This is achieved through the use of high velocity fluid flow streams which can be tolerated, despite the fineness of the particles being treated, in the toroidal fluid flow furnace. The effect is that all factors which can affect process kinetics are limited. A high thermal gradient is maintained; calcination products (eg water) are driven away as they form and the insulating gas layer which surrounds particles is thinned continuously;
(iii) improved product quality control; the rapid processing rate enabled by the factors described above allows the furnace to be a compact unit with a small amount of material in the processing zone at any one time (eg for a 5 tph plant approximately 25 kg needs to be in the processing chamber). Any variation in the product quality can be corrected by varying processing conditions with a rapid feedback of the effect of changes made.

By use of a furnace of the toroidal fluid flow heating zone kind, calcined material can be produced in which voids having a more uniform size and spatial distribution than those produced by other flash calcination methods.

In the method according to the first aspect of the present invention the treatment with a leaching agent may comprise immersion of flash calcined particulate aluminosilicate material in a suitable leaching agent comprising an acid-containing medium. The acid-containing medium may comprise an aqueous solution of an acid which dissolves aluminum. The acid may comprise a strong mineral acid, eg sulphuric, hydrochloric, nitric or phosphoric acid although it could alternatively comprise an organic acid such as formic acid or citric acid. The leaching agent may alternatively or in addition include an aluminum chelating agent such as EDTA. The treatment may be carried out using an elevated temperature, eg in the range 30° C. to 100° C., especially in the range 50° C. to 90° C. The elevated temperature may initially be achieved by the exothermic addition of a concentrated mineral acid solution to an aqueous suspension of the flash calcined aluminosilicate material.

Preferably, where a mineral acid is employed as leaching agent, the acid concentration in the medium employed for acid leaching is in the range 0.5 M (ie about 5% concentration) to 10 M (ie about 98% concentration). A beneficial acid leaching medium is sulphuric acid having a concentration of from 1 M to 3 M. A dilute 1 M to 3 M acid solution, eg of sulphuric acid, may conveniently be prepared by dilution in water of a quantity of concentrated acid, eg 10 M acid solution. The water to which the acid is added to dilute it preferably contains the flash calcined aluminosilicate material to be treated whereby the heat of dilution initially energises the dealuminising reaction by raising the temperature of the reaction mixture. The temperature may be maintained by the exothermic nature of the leaching reaction.

Agitation and/or stirring may be applied to assist treatment by the leaching step.

It is not necessary in the leaching step in the method according to the first aspect of the present invention for all of the aluminum present in the aluminosilicate material to be dissolved by the leaching agent. The primary requirement is for the agent to attack the aluminosilicate structure to form closed or open channels or pores extending from the voids produced from flash calcination whereby the porosity of the aluminosilicate particle structure is increased and the surface area of the particles is also increased. Preferably, at least 60% by weight, desirably at least 70% by weight of the aluminum is removed. For flash calcined particles comprising metakaolin it is desirable to remove at least 80% by weight, eg from 80% to 90% by weight, of the aluminum to achieve a surface area in excess of 220 $m^2 \cdot g^{-1}$ (this equates to a removal of about 32% to about 38% of the weight content of the metakaolin).

The length of time over which the aluminosilicate material is exposed to the leaching agent will depend upon the particular agent used, its concentration and other process conditions employed, eg temperature. We have found that a reaction time of between 1 and 2 hours is typically required to achieve the required surface area as illustrated in the Examples hereinafter.

After the formation of a suitable particulate product according to the second aspect of the present invention by leaching in the manner described, the particulate product may be separated from the leaching medium in a known way, eg by filtration, eg vacuum filtration. Thereafter the product may be washed with clean water and may be dried or suspended in clean water for delivery to a user. It is desirable that the temperature of the product is kept elevated, eg greater than 50° C., preferably 60° C. or more, during the separation and washing and drying steps. Preferably, copious quantities of hot water (eg having a temperature of at least 60° C.) are employed during washing. These procedures prevent the precipitation of aluminum-containing species.

According to the present invention in a second aspect there is provided a product comprising a particulate inorganic aluminosilicate material comprising particles of a flash calcined hydrous aluminosilicate material containing internal voids produced from the rapid heating of water contained in the aluminosilicate material during the flash calcining and etched channels or pores extending from or between the voids produced by an aluminum leaching process subsequent to formation of the voids. The product according to the second aspect may be produced by the method according to the first aspect as described hereinbefore.

The product according to the second aspect of the present invention may have a low specific gravity eg equal to or less than 2.2, desirably equal to or less than 2.1, and a high surface area, eg greater than 200 $m^2 \cdot g^{-1}$, preferably equal to or greater than 220 $m^2 \cdot g^{-1}$, in some cases at least 250 $m^2 \cdot g^{-1}$. The product may comprise a white pigment material. The product according to the second aspect may have a particle size distribution such that the $d_{50}$ value is in the range 0.5 µm to 3 µm and preferably such that at least 50 per cent by weight of the particles thereof have an esd less than 2 µm.

The pores of the particulate product according to the second aspect of the present invention may be measured by the known technique of thermoporometry and, as so measured, may show an average internal pore diameter of from 1 nm to 10 nm, especially 3 nm to 8 nm.

The product according to the second aspect may be used in various applications in which there is required a fine inorganic particulate material, especially a white pigment filler or extender material, having a high degree of porosity and low specific gravity and/or a high particulate surface area. The following are examples of applications which are suitable for the product according to the second aspect:

(a) paper products; the product may form a pigment or filler material employed in a paper or like sheet material making and/or coating composition in a known manner in or coated on cellulosic fibres;

(b) polymer based products; the product may be employed as a pigment, filler or extender material in polymers, eg thermoplastic materials such as polyolefins, paints, resins, sealants and the like;

(c) cementitious products in which the product may be employed as a lightweight pozzolanic additive;

(d) gas or liquid sorbent media;

(e) storage and controlled release media for chemicals, eg biocides, perfumes, pheromones, antioxidants and the like.

The high surface area and porous structure of the particles of the product according to the second aspect makes the product particularly attractive for in the following specific applications:

(a) as a lightweight thermal barrier layer in coating composition employed in coated paper, eg for use in thermal copying processes.

(b) as a lightweight, high opacity, highly scattering pigment ingredient in paper making, paper coating and matt paint compositions;

(c) as a porous, high surface area filler material for use (eg with a filler content of less than 10% by weight) in newsprint paper;

(d) as a filler for card and other low quality cellulosic sheet products;

(e) as a filler for carbonless copy paper;

(f) as a component of a microparticle system for enhancing retention, drainage and formation in a paper sheet forming process;

(g) as an exhaust gas filter or purifier medium;

(h) as an oil sorbent medium.

Use of the product according to the second aspect in a microparticle system in papermaking in application (f) may be carried out as follows:

In a paper making process, a high molecular weight flocculant polymer, eg a cationic acrylamide polymer, optionally after addition of a lower molecular weight coagulant polymer is added to a paper making pulp stream, usually containing conventional mineral fillers, prior to a shearing stage. A sample of mineral particles is added to the stream after the shearing stage (which may be the last shearing stage prior to formation of a paper sheet from the pulp stream). The mineral particles enhance the performances of the polymer as an aid to promote good retention, drainage and formation in the paper sheet forming process in a known manner. This known procedure is described for example in EP235893B. In application of the product according to the second aspect to this process the product is employed as the mineral particles after the shearing stage before which the flocculant polymer is added. The product has the benefit of high particulate surface area which is attractive for this application.

Where the product according to the second aspect of the invention is used as a speciality filler pigment in paper making (usually added to the pulp stream at an earlier stage of processing than the retention microparticle mineral particles described earlier) it may offer one or more of the following further benefits in the paper making process:

(i) an improvement in sheet ink strike through (otherwise known as print strike through) when the paper is printed upon;

(ii) an improvement in paper sheet friction coefficient;

(iii) an improvement in ink rub-off after printing of the paper sheet; and (iv) a medium for picking up and controlling 'stickies' at the wet end in the manner described in GB 2,314,324.

BRIEF DESCRIPTION OF THE ACCOMPANYING DRAWING

In the accompanying drawing, FIG. 1 is a graph of aluminum removal versus surface area for a particulate product produced by a method embodying the invention.

DESCRIPTION OF ILLUSTRATIVE EMBODIMENTS

Embodiments of the present invention will now be described by way of example with reference to the following Examples and with reference to the drawing.

EXAMPLE 1

Flash calcined clay (FCC) consisting essentially of metakaolin particles was prepared by calcining in a TORBED™ furnace a high purity kaolin particulate product having a particle size distribution such that $d_{50}$ for the product (as measured by sedimentation) was about 2 μm.

1 kg of the FCC and 4 kg of water were added to a thermally insulated 10 dm³ round-bottom flask. The flask was fitted with a flanged lid with access for a stainless steel paddle-stirrer, a reflux condenser and a 1 l dropping funnel. The FCC and water were mixed for 10 minutes to ensure the FCC was fully suspended. After this, 1 kg of 98% sulphuric acid was added to the suspension from the dropping funnel over a period of 2 hours. The material was stirred throughout and the temperature, due to the heat of acid dilution, was maintained at around 80° C. After 2 hours the material was vacuum filtered rapidly in a pre-heated stainless-steel Buchner funnel and then washed with ca 5 dm⁻³ of hot water (in excess of 60° C.). The etched material was then dried in an oven at 80° C. for 12 hours.

Before the acid treatment the FCC had a surface area measured by the $N_2$ adsorption BET method of 25 $m^2 \cdot g^{-1}$. After the treatment the surface area had been increased to 250 $m^2 \cdot g^{-1}$. The form of the $N_2$ adsorption isotherm indicates a microporous material has been produced.

EXAMPLE 2

The microporous product produced in Example 1 was further investigated using thermoporometry. Thermoporometry is a calorimetric procedure which can be used to measure the pore size distribution, pore volume and surface area of porous materials. It is described for example in 'Thermoporometry as a new tool in analysing mesoporous MCM-41 materials' by K R Kloestra, H W Zandbergen, M A van Koten, H van Bekkum Catalysis Letters 33 (1995) 145–156. Thermoporometry is based on the fact that the conditions of equilibrium of the solid, liquid and gaseous phases of a pure substance depend on the curvature of the solid-liquid interface. In the case of a liquid contained within a porous material, the solid-liquid curvature is strongly dependent on the dimensions of the pores. By recording the solidification thermogram of pure water contained within a porous medium the pore size can be calculated from the suppression of the water freezing point and the pore volume can be calculated from the amount of energy involved. An important advantage of this method is that it is sensitive to the overall dimensions of the pores not merely to the size of their entrances.

A thermoporometry trace for an acid-etched FCC prepared as described in Example 1 was produced. The data was collected on a Perkin-Elmer Series 7 DSC at a scanning rate of 0.5° C.·min⁻¹.

A depression of water freezing point, Δt, was detected and measured as −33° C. on the trace obtained.

According to the reference specified above the average diameter of the pores $R_p$ can be calculated from the following equation:

$$R_p = -64.67/\Delta t + 0.57$$

Therefore, the average diameter of the pores for the acid-etched FCC material given by thermoporometry is about 51 Å (5.1 nm).

EXAMPLE 3

An acid leached FCC was prepared as described in Example 1. At various stages during the acid leaching procedure, aliquots of the acid of the acid-containing suspension were taken and the amount of aluminum present in the acid was measured by conventional laboratory analytical techniques. This amount in each case was taken to be a measure of the aluminum leached from the particulate FCC material. At each corresponding stage, the surface area of the particulate FCC material was measured by nitrogen BET. The two results obtained for each stage were plotted graphically and the graph obtained, which is shown as FIG. 1, shows the correlation between product particulate surface area and extent of aluminum removal.

EXAMPLE 4

Various samples of particulate FCC products produced in the manner described in Example 1 were investigated for oil sorbency using a well known procedure according to a British standard. The uptake of a linseed oil using each product was measured.

Comparative measurements were made in a similar manner using various known samples of commercially available particulate filler products, viz titanium dioxide, kaolin, calcium carbonate and conventionally calcined clay. The results obtained were as given in Table 1 as follows.

TABLE 1

| Filler | Oil sorption (ml/100 g) |
| --- | --- |
| Titanium Dioxide | 20–45 |
| Kaolin | 30–40 |
| Calcium Carbonate | 40–60 |
| Calcined Clay | 60–90 |
| Acid Etched FCC (product of Example 1) | 120–160 |

EXAMPLE 5

A study was carried out to investigate the use of the product of Example 1 in newsprint. Handsheets were made according to standard TAPPI procedures using a standard newsprint fibre slurry and a retention aid chemical TRP 954 (Calgon Corporation) representing a standard newsprint furnish. 4% by weight of the investigated filler product was employed in the furnish. Various other commercially available conventionally calcined clays were investigated in a similar manner. Also, the flash calcined clay produced in Example 1 prior to the acid leaching step and a commercially available synthetic high surface area aluminosilicate material were also included in the comparative investigation. A summary of the filler materials included in the comparative investigation is as given in Table 2 as follows.

TABLE 2

| Filler | Filler type |
| --- | --- |
| 1 | Soak calcined clay |
| 2 | Soak calcined clay |
| 3 | Soak calcined clay |
| 4 | Soak calcined clay |
| 5 | Synthetic, high surface area aluminosilicate |
| 6 | Flash calcined clay |
| 7 | Acid leached, flash calcined clay (product of Example 1) |

Various properties of the handsheets produced using Fillers 1 to 7 were measured according to standard TAPPI procedures. The results obtained are own in Table 3 as follows.

TABLE 3

| Filler | ISO Brightness % | Scatter | Printers Opacity | Tensile Index N*m/g | COF tangent | Strike-through | Show-through |
|---|---|---|---|---|---|---|---|
| 1 | 61.4 | 684 | 92.4 | 19.5 | 0.63 | 0.14 | 0.14 |
| 2 | 60.9 | 666 | 92.2 | 22.4 | 0.6 | 0.14 | 0.15 |
| 3 | 61.8 | 712 | 92.8 | 20.4 | 0.59 | 0.14 | 0.14 |
| 4 | 61.5 | 702 | 92.7 | 20.6 | 0.66 | 0.14 | 0.14 |
| 5 | 61.3 | 669 | 91.9 | 20.8 | 0.75 | 0.14 | 0.14 |
| 6 | 61.1 | 669 | 92.2 | 21.5 | 0.62 | 0.14 | 0.13 |
| 7 | 62.2 | 691 | 92.2 | 21.7 | 0.72 | 0.14 | 0.13 |

In Table 3 COF tangent represents a measure of the coefficient of friction of each handsheet incorporating the filler under investigation. Of the fillers investigated, Filler 7 embodying the present invention shows the best combination of properties measured. In particular, it shows a high brightness, high tensile index and high coefficient of friction as well as acceptable opacity scatter, ink strike through and show through. Filler 5 shows a slightly better coefficient of friction than Filler 7 but overall has a combination of properties not as good as Filler 7 and is in any case a very expensive product because it is synthetic (ie not derived from natural mineral sources). It is possible for Filler 7 to be produced and sold more cheaply than Filler 5.

We claim:

1. A method of producing a porous inorganic particulate material which comprises treating a particulate aluminosilicate material with a leaching agent which chemically reacts with or solubilizes aluminum and thereby leaches aluminum from the aluminosilicate material, wherein the particulate aluminosilicate material is a particulate hydrous aluminosilicate material which has been flash calcined.

2. A method as claimed in claim 1 and wherein the aluminosilicate material which has been flash calcined comprises a kandite and/or smectite clay.

3. A method as claimed in claim 2 and wherein the aluminosilicate material which has been flash calcined comprises a material at least 90% by weight of which is kaolin.

4. A method as claimed in claim 1 and wherein the aluminosilicate material has been flash calcined in a process in which heating the material to a maximum temperature is such that the temperature of the material is raised at a rate of at least $5 \times 10^3$ Celsius degrees per second during the heating.

5. A method as claimed in claim 1 and wherein at least 90% by weight of the aluminosilicate material produced by flash calcining is metakaolin.

6. A method as claimed in claim 5 and wherein the hydrous aluminosilicate material which has been flash calcined comprises at least 90% by weight kaolin and the maximum temperature applied to the material in the flash calcining process is in the range 500° C. to 950° C.

7. A method as claimed in claim 1 and wherein the leaching agent is selected from the group consisting of mineral acids, organic acids and aluminum chelating agents.

8. A method as claimed in claim 1 and wherein the leaching step is carried out at a temperature in the range 30° C. to 100° C.

9. A method as claimed in claim 8 and wherein the temperature of an aqueous suspension of the flash calcined aluminosilicate material to be treated by leaching is initially raised by adding concentrated mineral acid to the suspension.

10. A method as claimed in claim 1 and wherein the particulate product obtained by leaching the flash calcined aluminosilicate material is separated from the leaching medium and washed in water.

11. A method as claimed in claim 10 and wherein the temperature of the particulate product obtained by leaching the flash calcined aluminosilicate material is maintained to be not less than 50° C. during the separation and washing steps.

12. A particulate product comprising a particulate inorganic aluminosilicate material comprising particles of a flash calcined hydrous aluminosilicate material containing internal voids produced from the rapid heating of water contained in the aluminosilicate material during the flash calcining and etched channels or pores from or between the voids produced by an aluminum leaching process subsequent to formation of the voids.

13. A particulate product as claimed in claim 12 and which has been produced by a method as claimed in claim 1.

14. A particulate product as claimed in claim 12 and which has a surface area of at least 200 $m^2 \cdot g^{-1}$.

15. A particulate product as claimed in claim 12 and which has a particle size distribution such that the $d_{50}$ value of the distribution is in the range 0.5 $\mu$m to 3 $\mu$m.

16. A particulate product as claimed in claim 12 and wherein the average internal diameter of the pores of the particles of the product is in the range 1 nm to 10 nm.

17. A particulate product as claimed in claim 12 and wherein the specific gravity of the product is 2.2 or less.

18. Use of a particulate product in a product selected from thermoplastic materials, paints, resins, sealants and other polymer based products, thermally printed copying paper, coated paper, newsprint and other paper or like products, gas and liquid sorbent media and chemical storage and controlled release media, wherein the particulate product comprises an inorganic aluminosilicate material comprising particles of a flash calcined hydrous aluminosilicate material containing internal voids produced from the rapid heating of water contained in the aluminosilicate material during the flash calcining and etched channels or pores from or between the voids produced by an aluminum leaching process subsequent to formation of the voids.

* * * * *